(12) United States Patent
Matsubara et al.

(10) Patent No.: US 9,354,861 B2
(45) Date of Patent: May 31, 2016

(54) WIRELESS COMMUNICATION TERMINAL, SOFTWARE UPDATE SYSTEM, AND SOFTWARE UPDATE METHOD

(71) Applicant: FUJITSU LIMITED, Kawasaki-shi, Kanagawa (JP)

(72) Inventors: Shigemasa Matsubara, Tokyo (JP); Katsumi Okuda, Tokyo (JP); Hajimu Hirai, Tokyo (JP); Yukio Hayashi, Tokyo (JP); Yasuaki Kamimura, Tokyo (JP); Masahiro Machida, Tokyo (JP); Masashi Kuwahara, Tokyo (JP); Joji Maruyama, Kawasaki (JP); Takao Ito, Kawasaki (JP); Katsunori Hayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/479,841

(22) Filed: Sep. 8, 2014

(65) Prior Publication Data
US 2014/0380298 A1 Dec. 25, 2014

Related U.S. Application Data

(63) Continuation of application No. PCT/JP2013/055850, filed on Mar. 4, 2013.

(30) Foreign Application Priority Data

Mar. 9, 2012 (JP) .................................. 2012-053831

(51) Int. Cl.
*G06F 9/445* (2006.01)
*H04M 1/725* (2006.01)
(Continued)

(52) U.S. Cl.
CPC ............. *G06F 8/65* (2013.01); *H04M 1/72525* (2013.01); *H04W 8/24* (2013.01); *H04W 24/02* (2013.01); *H04W 8/245* (2013.01)

(58) Field of Classification Search
None
See application file for complete search history.

(56) References Cited

U.S. PATENT DOCUMENTS

| 2004/0170175 | A1 | 9/2004 | Frank et al. | |
|---|---|---|---|---|
| 2009/0007091 | A1* | 1/2009 | Appiah | G06F 8/65 717/171 |
| 2012/0060152 | A1 | 3/2012 | Oh et al. | |

FOREIGN PATENT DOCUMENTS

| JP | 2002-342100 | 11/2002 |
|---|---|---|
| JP | 2003-198450 | 7/2003 |

(Continued)

OTHER PUBLICATIONS

International Search Report mailed May 14, 2013, in corresponding International Patent Application No. PCT/JP2013/055850.

(Continued)

*Primary Examiner* — Chuck Kendall
(74) *Attorney, Agent, or Firm* — Staas & Halsey LLP (57) ABSTRACT

A software update system includes an administration server, a wireless communication terminal, and a wireless-communication key station. The wireless communication terminal is configured to be connected to the administration server through a communication network. The a wireless-communication key station is configured to be positioned between the administration server and the wireless communication terminal, and to perform processing of distributing software of an update object transmitted from the administration server to the wireless communication terminal.

19 Claims, 9 Drawing Sheets

(51) Int. Cl.
*H04W 8/24* (2009.01)
*H04W 24/02* (2009.01)

(56) References Cited

FOREIGN PATENT DOCUMENTS

| | | |
|---|---|---|
| JP | 2004-317346 | 11/2004 |
| JP | 2006-506847 | 2/2006 |
| JP | 2006-171859 | 6/2006 |
| JP | 2009-188930 | 8/2009 |
| JP | 2010-186206 | 8/2010 |
| JP | 2010-288026 | 12/2010 |
| JP | 2012-59260 | 3/2012 |

OTHER PUBLICATIONS

Office Action issued by the Japanese Patent Office on Mar. 22, 2016 in corresponding Japanese patent application No. 2014-503835.

* cited by examiner

WIRELESS COMMUNICATION TERMINAL, SOFTWARE UPDATE SYSTEM, AND SOFTWARE UPDATE METHOD

CROSS-REFERENCE TO RELATED APPLICATIONS

This application is a continuation of International Application No. PCT/JP2013/055850, filed on Mar. 4, 2013 which claims the benefit of priority of the prior Japanese Patent Application No. 2012-053831, filed on Mar. 9, 2012, the entire contents of which are incorporated herein by reference.

FIELD

The embodiments discussed herein are related to a wireless communication terminal, a software update system, and a software update method.

BACKGROUND

In recent years, concern about a multifaceted use of renewable energy and an energy-saving society has been increasing, and introduction of a smart meter system that enables visualization of power consumption by an automated meter reading, control of supply and demand, and the like has been promoted. In such a smart meter system, a wireless communication network is formed by, for example, adding a wireless communication terminal that has a wireless communication unit to an electrical-power meter arranged per consumer, to organically connect to a backbone network of an electric power company or the like, thereby configuring such that centralized management and control by an operator are enabled.

Because the wireless communication terminal is arranged per consumer as described above, the quantity thereof is huge, and there is a task of optimization to reduce power consumption for suppressing the amount of electricity usage amount to be added and to achieve low prices to reduce the introduction cost.

Moreover, when a wireless mesh communication system is adopted as a wireless communication system that is comparatively compatible with the smart meter system, it is supposed to set the transmission interval of a firmware delivery packet comparatively long because of the radio wave interference in the system, and to increase distribution time. Therefore, it is desirable that the use efficiency of the communication resources be improved.

Such a wireless communication terminal has software or firmware (hereinafter, simply "software") to perform various kinds of processing an control to implement a wireless communication function or an additional function installed therein, and it is supposed to update the software to add new functions, solve a problem such as bugs, and the like.

As a related technique relating to software update for a wireless communication terminal, for example, in a technique disclosed in Japanese Laid-open Patent Publication No. 2003-198450, a system and a method are proposed that aim to suppress a load on an operator to a minimum and to maintain high usage efficiency of a wireless source by going through such steps that a wireless communication base station notifies a wireless communication terminal of software update information, the wireless communication terminal that receives the update information performs determination about the update information, and when update is supposed, receives software of an update object that is distributed by broadcasting from the wireless communication base station separately, by controlling a software receiving unit in the terminal itself to update the software.

According to the above related technique, a wireless communication terminal receives update information that is transmitted separately from distribution of software and determines whether software update is supposed. Accordingly, if the update information is unable to be received, whether update is supposed is not determined even if software distribution data requiring update is received and the data is to be discarded. Therefore, there has been a problem that distribution efficiency of software is lowered.

SUMMARY

According to an aspect of the embodiments, a software update system includes: an administration server; a wireless communication terminal configured to be connected to the administration server through a communication network; and a wireless-communication key station configured to be positioned between the administration server and the wireless communication terminal, and to perform processing of distributing software of an update object transmitted from the administration server to the wireless communication terminal. The software update system performs update processing of software installed in the wireless communication terminal based on information transmitted from the administration server. A memory configured to store software of the wireless communication terminal is provided in each of the wireless-communication key station and the wireless communication terminal, software distribution processing from the administration server to the wireless communication terminal is performed, dividing into two sections of the administration server to the wireless-communication key station, and the wireless-communication key station to the wireless communication terminal. One processing that is performed dividing into two sections is processing of registering the software and software related information transmitted from the administration server in the memory of the wireless-communication key station. Another processing that is performed dividing into two sections is processing of storing the software and the software related information distributed from the wireless-communication key station in the memory of the wireless communication terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The present invention is not limited to the embodiment described below.

Figure 1:
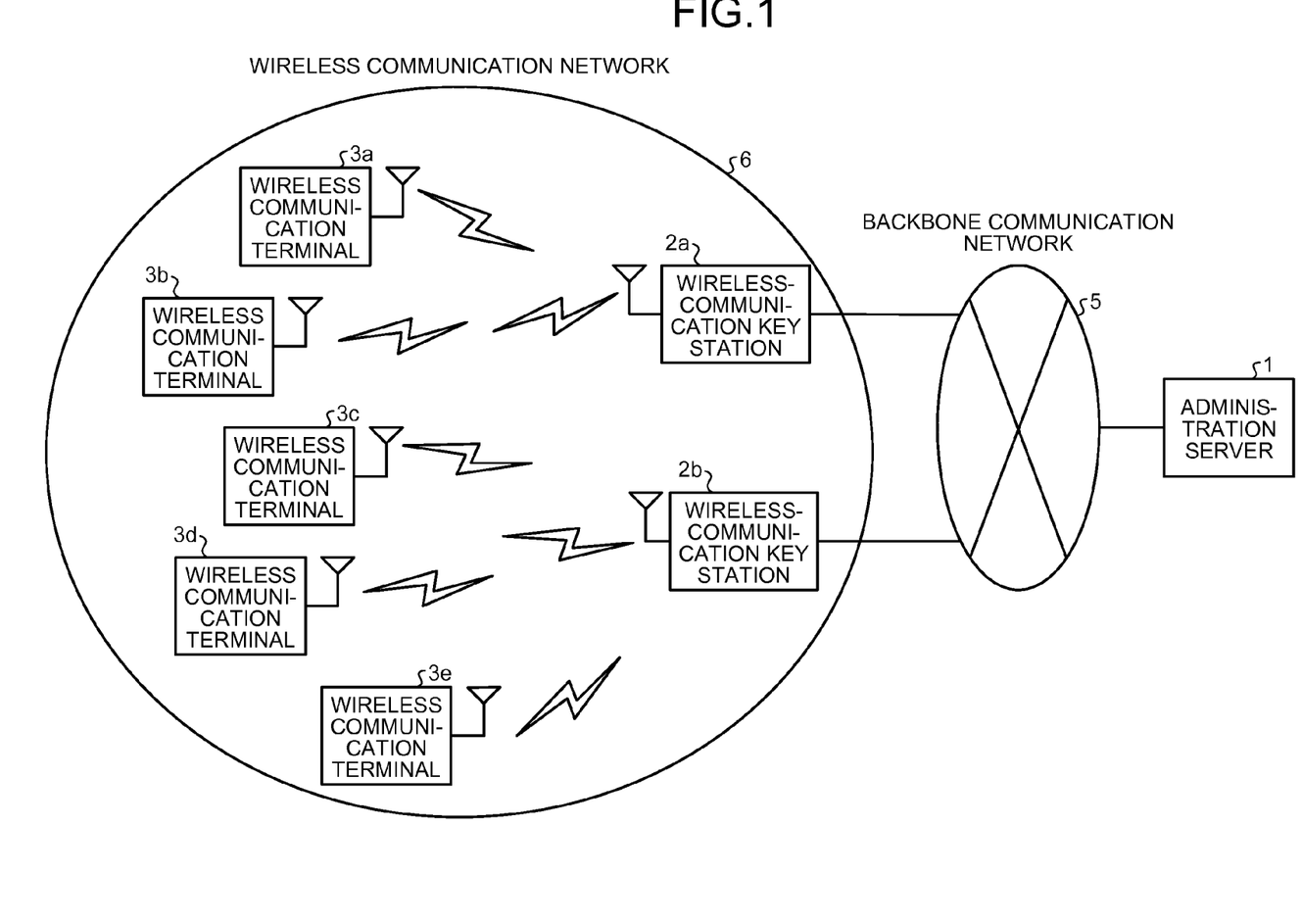
FIG. 1 is a schematic diagram illustrating an example of a wireless communication system configured such that a wireless communication terminal, a software update system, and a software update method according to an embodiment of the present invention are applicable.

FIG. 1 is a schematic diagram illustrating an example of a wireless communication system configured such that the wireless communication terminal, the software update system, and the software update method according to an embodiment of the present invention are applicable. Multiple wireless communication terminals 3 (in FIG. 1, five units of wireless communication terminals 3a to 3e are illustrated) are directly connected or indirectly connected through another wireless communication terminal not illustrated to at least one wireless-communication key station 2 (in FIG. 1, two units of wireless-communication key stations 2a and 2b are illustrated) by a wireless-communications means. As illustrated, a wireless communication network 6 is constituted of these wireless communication terminal 3 and the wireless-communication key station 2.

Moreover, the wireless-communication key station 2 is connected to a backbone communication network 5 by a wireless communication means or a wire communication means. On the other hand, an administration server 1 is directly connected to the backbone communication network 5. By this connection, the wireless-communication key station 2 and the administration server 1 are connected such that communication is possible through the backbone communication network 5.

As described above, the wireless communication system according to the present embodiment is constituted of the administration server 1, the backbone communication network 5, and at least one unit of the wireless-communication key station 2 and a plurality of the wireless communication terminals 3 forming the wireless communication network 6. An operator and an administrator that use this system perform centralized control and administration of the wireless communication terminals 3 through the administration server 1.

Figure 2:
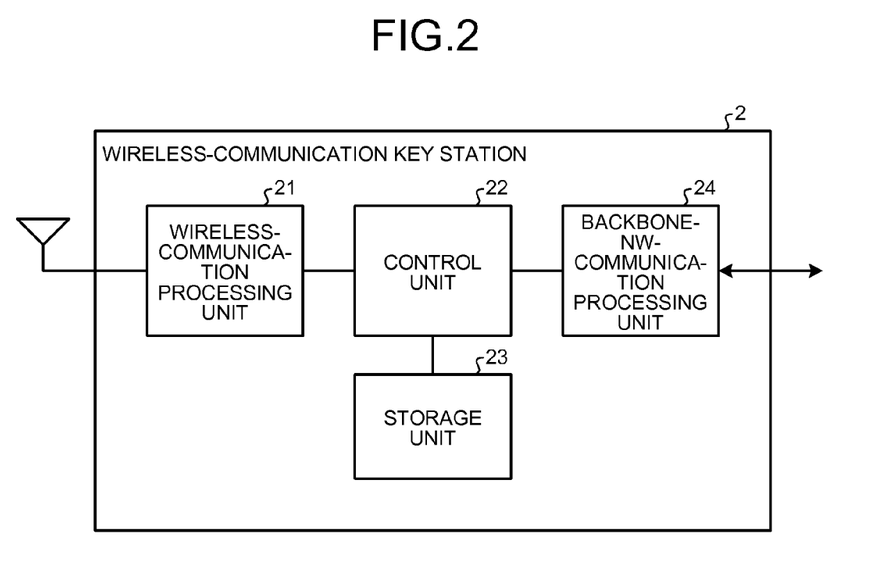
FIG. 2 is a block diagram illustrating a configuration example of a wireless-communication key station according to the embodiment of the present invention.

FIG. 2 is a block diagram illustrating a configuration example of the wireless-communication key station according to the embodiment of the present invention. As illustrated, the wireless-communication key station 2 includes a wireless-communication processing unit 21 that performs wireless communication processing to connect to the wireless communication network 6, a control unit 22 that performs predetermined control in the wireless-communication key station, a storage unit 23 to store necessary information, and a backbone-network (NW)-communication processing unit 24 that performs communication processing to connect to the backbone communication network 5. The storage unit 23 is configured so as to be able to store at least one set of software distributed to the wireless communication terminal 3 and software related information described later.

Figure 3:
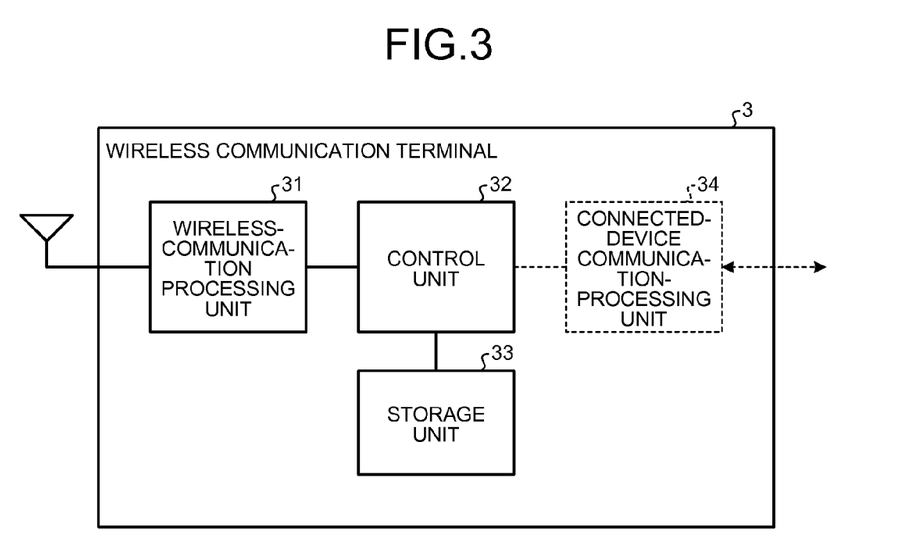
FIG. 3 is a block diagram illustrating a configuration example of a wireless communication terminal according to the embodiment of the present invention.

FIG. 3 is a block diagram illustrating a configuration example of the wireless communication terminal according to the embodiment of the present invention. As illustrated, the wireless communication terminal 3 includes a wireless communication processing unit 31 that performs wireless communication processing to connect to the wireless communication network 6, a control unit 32 that performs predetermined control in the wireless communication terminal, and a storage unit 33 to store necessary information. As indicated by broken lines in the figure, a connected-device communication-processing unit 34 that performs communication processing with a connected device may be arranged. If, for example, a communication interface with a connected device such as an electric power meter and a personal computer (PC) is arranged as this connected-device communication-processing unit 34, it can be configured as a device serving as a wireless communication interface to have the connected device included in the wireless communication network.

The storage unit 33 is partitioned into a volatile memory region to be used to temporarily store a work area in operation and the like, and a nonvolatile memory region to be used to steadily store device specific information and the like, and is configured such that two pieces each (two sets) of software and software related information (details of the software related information are explained later) in sets can be stored in the nonvolatile memory region.

Out of two pieces of software, one is software that is used for current operation, and the other is software that is not used for current operation. In the following explanation, the former is referred to as operating software, and the latter is referred to as non-operating software. Moreover, the area in which the operating software is stored is referred to as an operating software area, and the area in which the non-operating software is stored is referred to as a non-operating software area.

In software update processing, rewrite of the non-operating software area is performed and after rewrite is completed, control of switching the non-operating software to the operating software is performed by an autonomous restart.

If a restart occurs during the software update processing, the software that is operating disappears and operation is disabled highly possibly. Therefore, in terms of guarantee of operation in such an update transient state, it is preferable that at least two pieces each (two sets) of software and software related information be stored.

Figure 4:
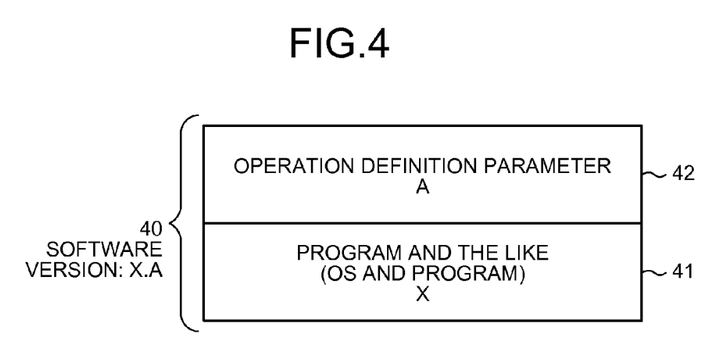
FIG. 4 illustrates definition example of a software version at the wireless communication terminal.

FIG. 4 illustrates definition example of a software version in the wireless communication terminal. The wireless communication terminal 3 according to the present embodiment manages software 40, dividing into an operating system (OS) and a program running on the OS (hereinafter, those two are collectively referred to as "program and the like") 41, and a parameter (hereinafter, "operation definition parameter") 42 that provides operation definitions, such as an operation frequency and a constant given to the program, to the program and the like 41. By thus dividing to manage the software 40, for example, when only the operation definition parameter is supposed to be modified and the program and the like are not supposed to be modified, aimed modification in operation can be achieved just by modifying the operation definition parameter. Accordingly, by defining such an operation definition parameter, an amount of modification in software update can be reduced. Moreover, because the amount of modification can be reduced, an amount of distribution of software to be modified can also be reduced.

For example, when a version of the program and the like is X, and a version of the operation definition parameter is A, software version information is expressed as "X.A".

By thus expressing a software version in management, a version of the program and the like and a version of the operation definition parameter can be uniquely identified from the information of the software version. Thus, at the time of software update, compatibility of software configuration information held therein can be determined from the information of a software version of an update object, and an operator, the wireless-communication key station, or the wireless communication terminal can independently determine whether update of only the configuration information is possible or whether the configuration information can be used, to enable reduction in the amount of information to be transferred.

Figure 5:
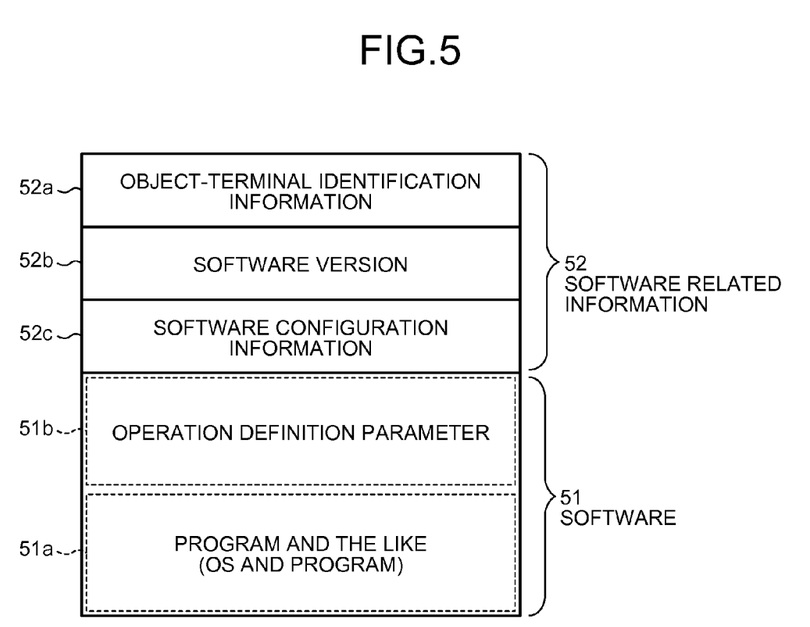
FIG. 5 illustrates a configuration example of software and software related information that are decompressed at the wireless communication terminal.

FIG. 5 illustrates a configuration example of software and software related information that are decompressed at the wireless communication terminal. As illustrated in FIG. 5, software 51 is constituted of a program and the like 51a that is the entity of the software as indicated in FIG. 4, and an operation definition parameter 51b for the program and the like 51a. Software related information 52 is constituted of object-terminal identification information 52a that is set to achieve an effect of the present embodiment, a software version 52b described above, and software configuration information 52c.

The object-terminal identification information 52a includes, for example, a manufacturer identification (ID) to identify a manufacturer, a hardware ID to identify a hardware type, and the like so that the wireless communication terminal of an application object can be uniquely identified. The software version 52b is configured with the software version as indicated in FIG. 4, as a version of software. The software configuration information 52c includes a software size, information on gross size (total size of the entire program and the like and operation definition parameter) of software so that the program and the like being the entity of the software and the operation definition parameter can be identified, and information on relative positions of the focused program and the like and the operation definition parameter in the wireless communication terminal. Software in the wireless communication terminal is decomposed in a storage area (that is, the storage unit 33) in the wireless communication terminal 3 so as to coincide with the software configuration information.

Figure 6:
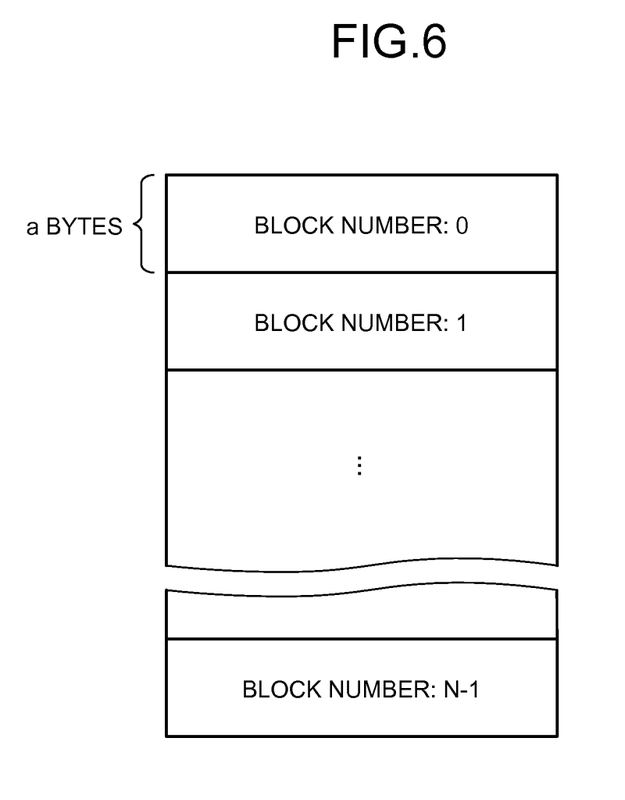
FIG. 6 illustrates a specific example of a software configuration at the wireless communication terminal.

FIG. 6 illustrates a specific example of a software configuration at the wireless communication terminal. In the example illustrated in FIG. 6, software and software related information are divided into blocks of a certain size, a bytes (a: 128, for example). This block size is determined so as to conform to constraints of a wireless communication packet, for example, a payload length, and it is desirable that one block is stored in one wireless packet to be distributed.

By configuring as indicated in FIG. 6, in software distribution processing performed in a packet unit, for example, a state indicating distribution completed/not completed can be managed only based on block numbers (in the example of FIG. 6, N pieces from 0 to N−1), and information management can be simplified.

Figure 7:
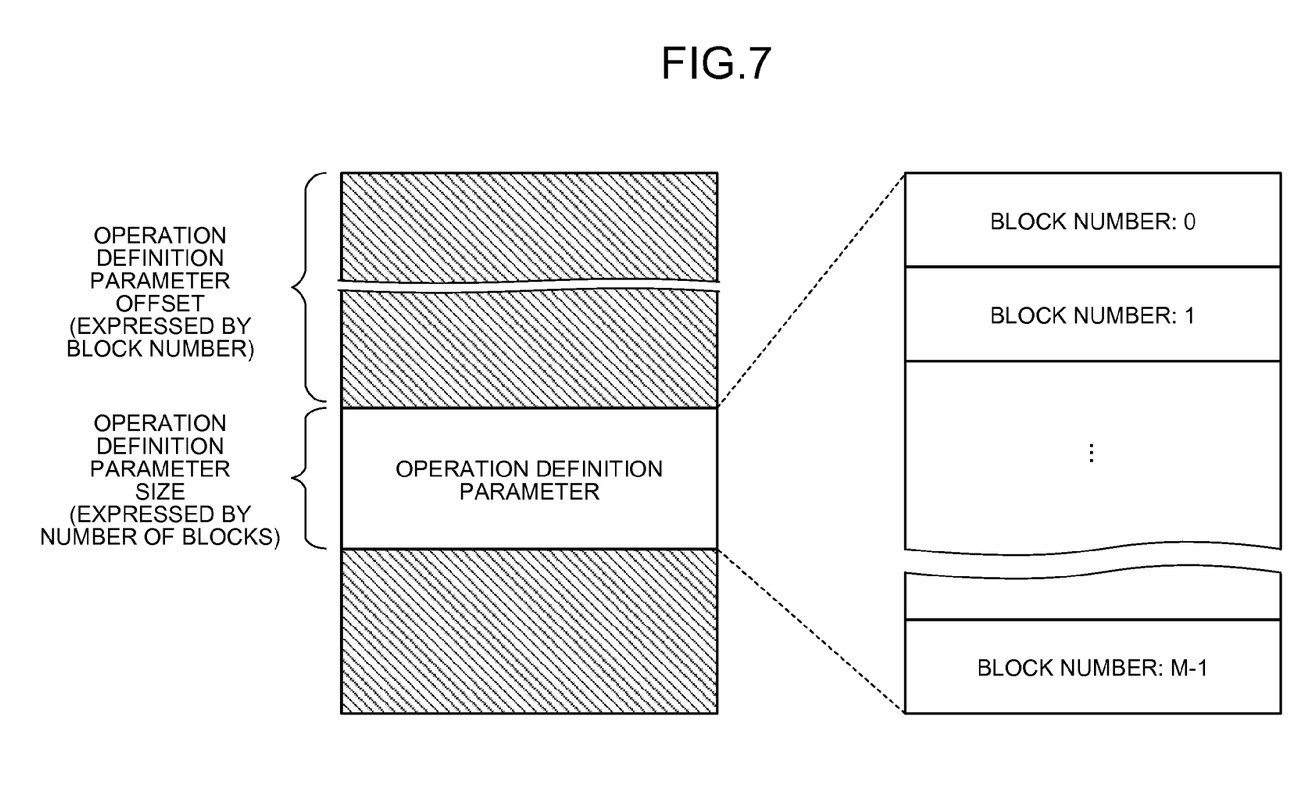
FIG. 7 illustrates an implementation example to identify an operation definition parameter in software.

Furthermore, when software is divided as illustrated in FIG. 4, the operation definition parameter can also be managed in a similar way as software and the software related information. FIG. 7 illustrates an implementation example to identify operation definition parameter in software. As illustrated in FIG. 7, the operation definition parameter can be identified by an operation-definition parameter offset and an operation-definition parameter size in software. The operation-definition parameter offset is expressed in a block number relative to the top portion of software, and the starting block of the operation definition parameter can be identified thereby. For the operation-definition parameter size, by expressing the size of an operation definition parameter in the number of blocks, it is possible to identify how many blocks from the top block the parameter is formed with. With this method, as illustrated in a right side in FIG. 7, it becomes possible to identify M pieces of blocks from block number 0 to block number M−1 as the operation definition parameter. Furthermore, with this method, even when the operation definition parameter is arranged at an arbitrary position in software (in the example of a figure on a left side in FIG. 7, the operation definition parameter is arranged in such a form that the program and the like in the software is divided by the operation definition parameter), the position of the operation definition parameter can be easily and uniquely identified.

Next, a software update operation according to the present embodiment is explained with the configuration example of the wireless communication system, the wireless-communication key station, and the wireless communication terminal, the definition example of a software version of the wireless communication terminal, the configuration example of software and the software related information, and the like described above, as preconditions.

Figure 8:
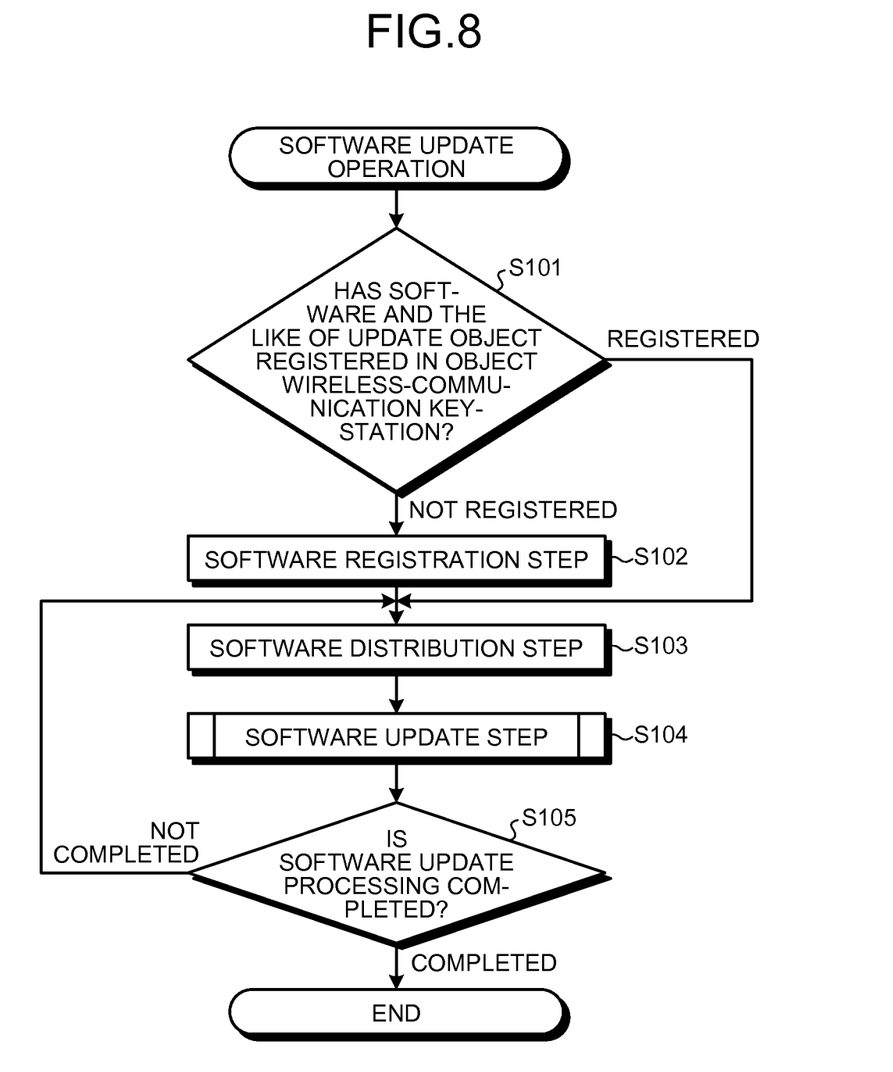
FIG. 8 is a flowchart indicating a flow of a software update operation according to the embodiment.

FIG. 8 is a flowchart indicating a flow of the software update operation according to the present embodiment. This operation flow may be performed with an operator involved, or may be performed automatically without an operator involved except for start of the processing, and the like. Suppose that prior to the start of the processing, software of an update object and the software related information are stored in the administration server. Moreover, in the following explanation, "software and the software related information" is referred to as "software and the like information", "wireless communication terminal that requests software and the like information of an update object" is referred to as "object wireless-communication terminal", and "wireless-communication key station that distributes software and the like information of an update object to an object wireless-communication terminal" is referred to as "object wireless-communication key-station". Note that the terms "update" and "update object" are terms applied when the wireless communication terminal is viewed form the administration server, and as for terms used when the wireless communication terminal is viewed from the wireless-communication key station, terms of "distribution" and "distribution object" are used.

In FIG. 8, at step S101, whether software and the like information of an update object has been registered in the object wireless-communication key-station is determined, and when not yet registered, process proceeds to step S102, to perform processing of registering the software and the like information (software and the like information of an update object) in the object wireless-communication key-station. The determination processing at step S101 may be performed by the administration server, or may be performed by the wireless-communication key station in response to an inquiry from the administration server, and a determination result may be informed to the administration server.

In the processing at step S102, the software and the like information of the update object and information specifying a storage region are transmitted from the administration server to the wireless-communication key station. The wireless-communication key station stores the transmitted software and the like information in the specified storage region. A feature of this processing is to include information specifying a storage region in the wireless-communication key station as information transmitted to the wireless-communication key station from the administration server. This enables centralized control such that a useful storage region is preferentially saved, and possibility that this processing (software registration step) at step S102 can be omitted increases.

On the other hand, when the software and the like information of an update object has been registered in the object wireless-communication key-station, the processing at step S102 is skipped and the process proceeds to step S103. At step S103, according to an instruction from the administration server to the object wireless-communication key-station, the processing of distributing the software and the like information of an update object from the object wireless-communication key-station to the object wireless-communication terminal is performed. Note that in the following paragraphs including this paragraph, processing of transmitting necessary software and the like information from the administration server to the object wireless-communication key-station and storing the software and the like information in the storage unit of the object wireless-communication key-station is referred to as "registration", and processing of transmitting software and the like information from the object wireless-communication key-station to the object wireless-communication terminal is referred to as "distribution", and processing of storing the distributed software and the like information in the storage unit of the object wireless-communication terminal to activate as operating software is referred to as "update".

Subsequently, the processing at step S103 is explained in detail using FIG. 1 and FIG. 5. First, the administration server 1 transmits distribution destination information, distribution configuration information, software related information, and software update time as information to instruct software distribution to the object wireless-communication key-station (for example, the wireless-communication key station 2a).

The distribution destination information indicates a wireless communication terminal(s) of a distribution target, and is configured with, for example, medium access control (MAC) address including unicast, multicast, and broadcast, or the like. The distribution configuration information is configured with configuration information related to software of the distribution object, that is, information indicating the program and the like (OS and a program) 51a, the operation definition parameter 51b, or both of them (entire software) indicated in FIG. 5. The software related information is the object-terminal identification information 52a, the software version 52b, and the software configuration information 52c indicated in FIG. 5 as well. The software update time indicates time (specified time described later) at which software is activated by the object wireless-communication terminal (for example, the wireless communication terminal 3a).

The wireless-communication key station 2a identifies software and software related information registered therein by comparing with instructed software related information, reads software and/or software related information specified by the distribution configuration information, and distributes generated software distribution packets to the wireless communication terminal 3a that is a distribution destination specified by the distribution destination information in a predetermined packet unit.

Thereafter, at step S104, a software update step described later is performed at the wireless communication terminal. AT step S105, whether the software update processing is completed is determined, and when not completed, the process returns to the processing at step S103 and the processing described above is continued, and when completed, this flow is ended.

As described above, in the processing flow indicated in FIG. 8, the software registration step and the software distribution step are performed in a clearly separated manner. With a feature of this processing and the system configuration in which the wireless-communication key station 2 is involved between the administration server 1 and the wireless communication terminal 3, for example, when identical software is to be distributed to the plurality of the wireless communication terminals 3 at respectively different times, repeated performance of the software registration step can be omitted. This enables to reduce an operation load on an operator, and to reduce a communication amount between the administration server and the wireless-communication key station. At this time, it is preferable that a storage region be reserved so that the wireless-communication key station can store the software and the like information (software and software related information: refer to FIG. 5) of the wireless communication terminal as much as possible. It is obvious that the more software and the like information the wireless-communication key station holds, the more possibility of being able to omit the software registration step it has. Moreover, because such a circumstance in which requisite minimum software configuration information is requested to be distributed to an arbitrary and requisite minimum number of distribution destinations can be created, and therefore, the use efficiency of wireless resources at the software distribution processing can be enhanced.

Figure 9:
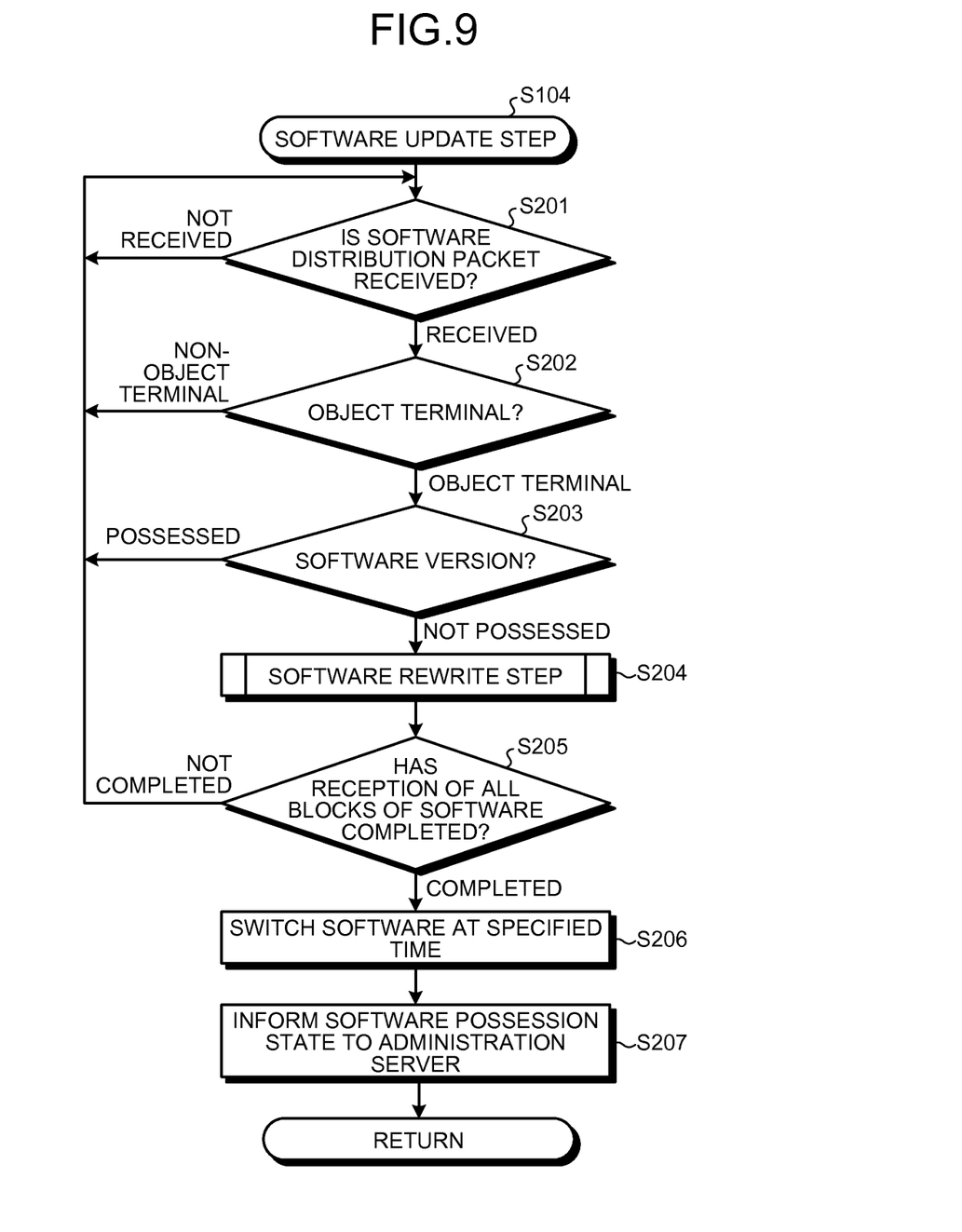
FIG. 9 is a flowchart indicating an operation flow at a software update step (step S104) indicated in FIG. 8.

Furthermore, FIG. 9 is a flowchart indicating an operation flow at the software update step (step S104) indicated in FIG. 8. This operation flow is performed after the software distribution step (step S103: refer to FIG. 8) is performed, and at step S201, whether a software distribution packet distributed from the wireless-communication key station is received by the wireless communication terminal is determined. When the software distribution packet is not received, the process returns to a state in which the processing at step S201 is continued, that is a state in which a following software distribution packet is waited. On the other hand, when the software distribution packet is received, the process proceeds to step S202, and the "object terminal identification information" included in the software distribution packet and the "device identification information (the device identification information includes all of the terminal identification information factors of the terminal itself) that is set in the terminal itself in advance are compared, and whether the terminal itself is an "object terminal" or a "non-object terminal" is determined. When a result of comparison is inconsistent, it is determined that the terminal itself is not the object terminal, to discard the software distribution packet, and the process returns to step S201 to be in a state in which a following packet is waited. On the other hand, when the result of comparison is consistent, it is determined that the terminal itself is the object terminal, and the process proceeds to the processing of step S203.

Figure 10:
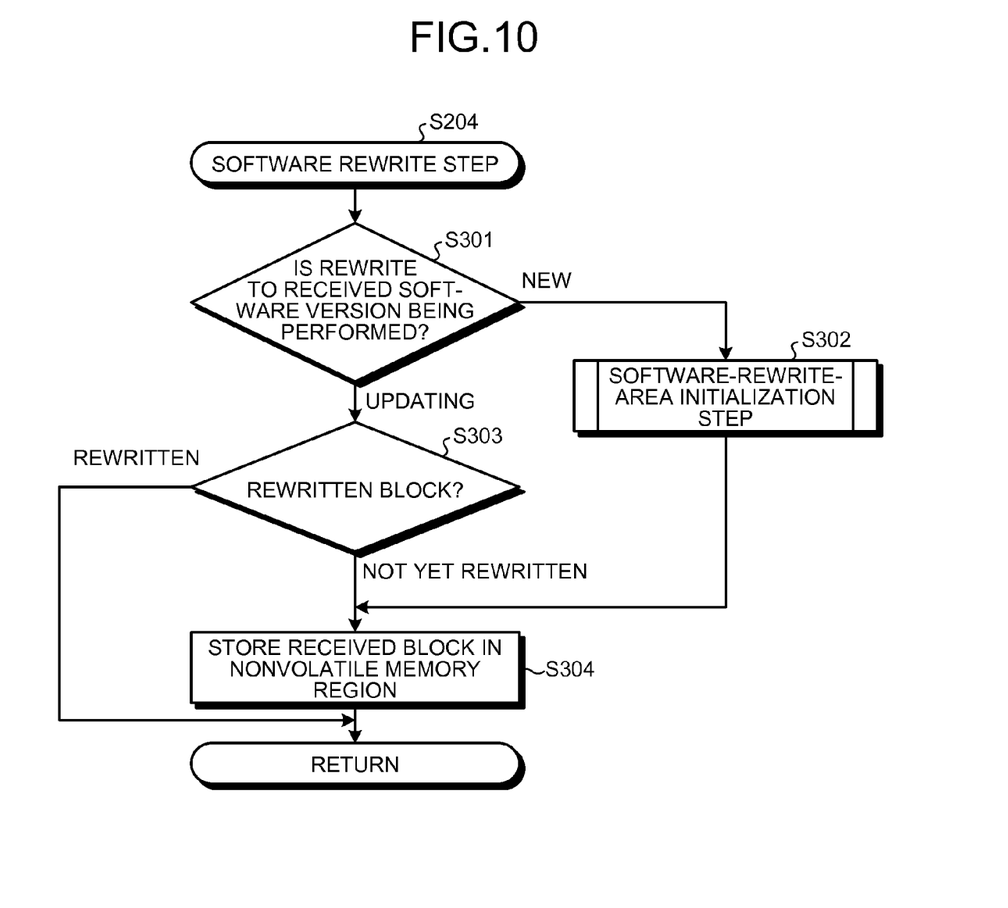
FIG. 10 is a flowchart indicating an operation flow at a software rewrite step (step S204) indicated in FIG. 9.

At step S203, the "software version information" included in the software distribution packet and the "software version information" held by the terminal itself are compared. When a result of comparison is consistent, it is determined that the software is the one that has already been possessed, to discard the software distribution packet, and the process returns to step S201 to be in a state in which a following packet is waited. On the other hand the result of comparison is inconsistent, it is determined that the software is the one that has not been updated and that should be updated, to perform a software rewrite step (step S204) that is indicated as a subroutine in FIG. 10 is performed, and the process proceeds to step S205.

At step S205, it is determined whether all blocks of the software has been received, and when not received, the process shifts to step S201 to be in a state in which a following software distribution packet is waited. On the other hand, when all blocks has been received, software switching processing, restart processing, and the like are performed at specified time (the software update time included in the distribution packet, or time instructed by an operator or the wireless-communication key station) (step S206), a software possession state is informed to the administration server (step S207), and the software update processing step (step S104) is ended.

Figure 11:
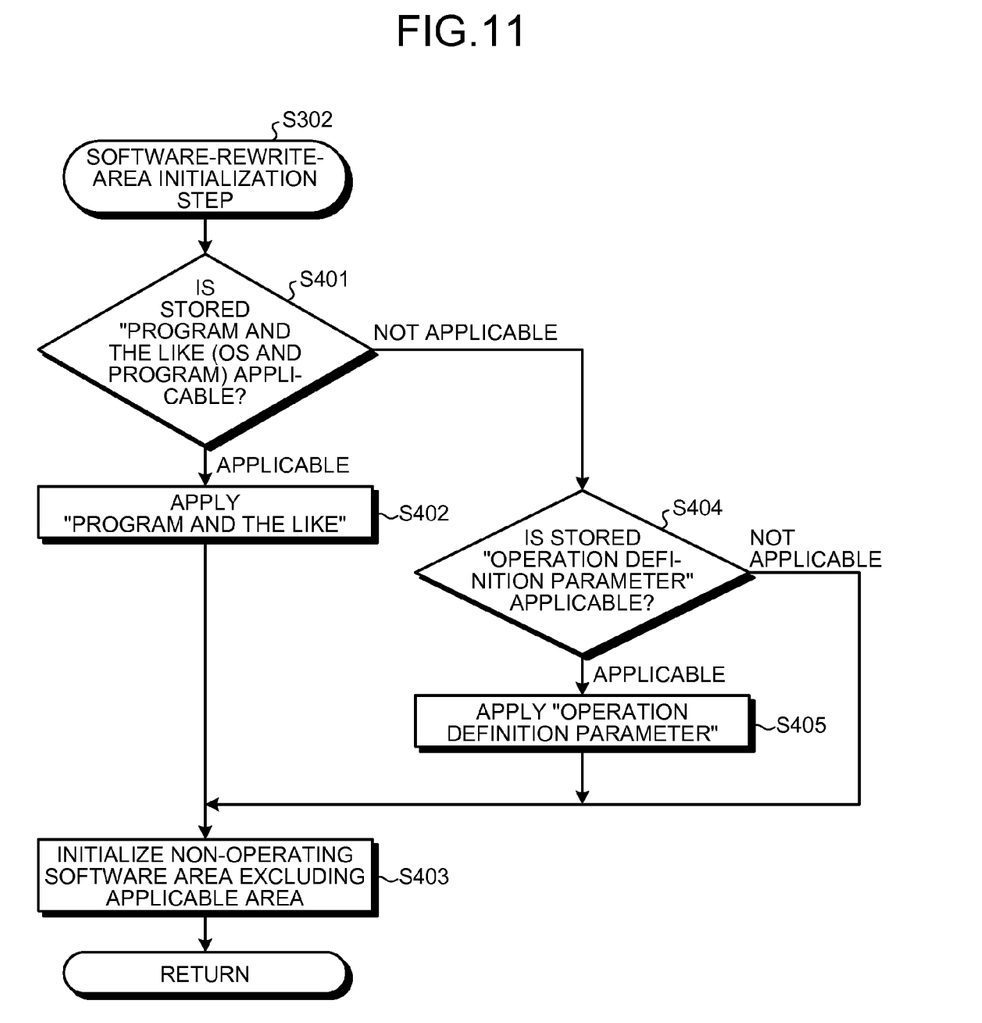
FIG. 11 is a flowchart indicating an operation flow at a software-rewrite-area initialization step (step S302) indicated in FIG. 10.

Next, the software rewrite step (step S204) that is performed in the software update step (step S104) is explained. FIG. 10 is a flowchart indicating an operation flow at the software rewrite step. This operation flow is processing performed after performance of step S203 (refer to FIG. 9). It is determined whether rewrite to the software version included in the received software distribution packet is being performed, that is, update is being performed (step S301), and when update is not being performed (rewrite is not performed), it is determined as new software information, to proceed to step S302 details of which are indicated in FIG. 11. On the other hand, when update is being performed, it is determined whether contents of the received packet is a block that has already been rewritten (step S303), and when already rewritten, the one in the received block is discarded to return to the processing of an origin of a call, and when not yet rewritten, the received block is stored in the nonvolatile memory region of non-operating software that is already being rewritten (step S304), to return to the processing of an origin of a call.

Next, a software-rewrite-area initialization step (step S302) that is performed in the software rewrite step (step S204) is explained. FIG. 11 is a flowchart indicating an operation flow at the software-rewrite-area initialization step. This operation flow is a processing flow that is performed when a received reception packet is not one being rewritten at the determination processing at step S301 (refer to FIG. 10). In this processing flow, first, version information of software of a rewrite object and version information of operating/non-operating software held therein are compared, and it is determined whether a "program and the like (OS and program)", which is part configuration information of the software, is applicable (step S401), and if applicable, the program and the like are applied (step S402), and the process proceeds to step S403. Note that "application" herein means to activate information of an application object in a rewritten area using the software information to make it "rewritten". The application object is configuration information of non-operating software, the information is activated as it is, and when the application object is part configuration information of operating software, the information is first copied in a non-operating software area, and then activated.

Referring back to the flow in FIG. 11, at step S401, when it is determined that the program and the like is not applicable, it is then determined whether an "operation definition parameter", which is the part configuration information of the software, is applicable (step S404), and when it is not applicable, the process proceeds to step S403, and when it is applicable, the operation definition parameter is applied (step S405), and the process proceeds to step S403. At this step S403, processing of initializing an area (non-operating software area) excluding an applicable area, or of invalidating information stored in the non-operating software area is performed, to end the software-rewrite-area initializing step indicated in FIG. 11.

As explained above, according to the distribution processing or the update processing according to the present embodiment, when a software distribution packet is received, it is possible to determine, at the wireless communication terminal, whether update of the software is supposed, and therefore, a load on an operator can be reduced. Moreover, because chances of discarding software distribution packets requiring update are reduced, the software distribution efficiency can be improved, and the use efficiency of communication resources can be maintained high.

According to the distribution processing or the update processing according to the present embodiment, two areas of an operating software area and a non-operating software area are prepared (divided), rewrite of the non-operating area is performed at the update processing of software, and when rewrite is completed, the non-operating software area is switched to the operating software area, and therefore, received software distribution data can be immediately stored in a non-volatile memory so that a volatile memory is not supposed to be used as a temporary storage area, to be able to reduce a requested amount of the volatile memory, and low power consumption and low prices can be achieved.

According to the distribution processing or the update processing according to the present embodiment, because software and software related information are managed in a pair, when software that is compatible with received software is present among stored software, part information of the software can be used, and therefore, an update amount of software can be reduced, the distribution efficiency of software can be improved, and the distribution time of software can be reduced.

According to the present invention, such an effect is produced that deterioration in software distribution efficiency can be controlled, suppressing a load on an operator, and the use efficiency of communication resources can be maintained high.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A software update system comprising:
   an administration server;
   a wireless communication terminal configured to be connected to the administration server through a communication network; and
   a wireless-communication key station configured to be positioned between the administration server and the wireless communication terminal, and to perform processing of distributing software of an update object transmitted from the administration server to the wireless communication terminal,
   wherein
   the software update system performs update processing of software installed in the wireless communication terminal based on information transmitted from the administration server,
   a memory configured to store software of the wireless communication terminal is provided in each of the wireless-communication key station and the wireless communication terminal, software distribution processing from the administration server to the wireless communication terminal is performed in two sections of the administration server to the wireless-communication key station, and the wireless-communication key station to the wireless communication terminal, one processing in the two sections is processing of registering the software and software related information transmitted from the administration server in the memory of the wireless-communication key station, and another processing in the two sections is processing of storing the software and the software related information distributed from the wireless-communication key station in the memory of the wireless communication terminal.

2. The software update system according to claim 1, wherein the software related information includes identification information of a wireless communication terminal to be a target on software updating, and software version information and software configuration information.

3. The software update system according to claim 2, wherein the administration server transmits, to the wireless-communication key station, information related to specified time at which software updated at the wireless communication terminal is activated, in addition to the software related information, the wireless-communication key station transmits the information related to specified time informed by the administration server to the wireless communication terminal, and the wireless communication terminal activates software to be updated based on the information related to specified time informed by the wireless-communication key station.

4. The software update system according to claim 2, wherein the software version information includes version information of an operating system (OS) and a program, and version information of an operation definition parameter that includes an operation frequency of the program and a constant to be given to the program.

5. The software update system according to claim 1, wherein whether the software of an update object and software related information have been registered in a target wireless-communication key station is determined, and when determined as not registered, processing of registering the software of the update object and the software related information in the target wireless-communication key station is performed, and when determined as registered, the processing of registering is skipped.

6. The software update system according to claim 5, wherein determination processing of whether the software of an update object and the software related information have been registered in the target wireless-communication key station is performed by the administration server.

7. The software update system according to claim 5, wherein determination processing of whether the software of an update object and the software related information have been registered in the target wireless-communication key station is performed by the wireless-communication key station.

8. The software update system according to claim 5, wherein when transmitting to register the software of an update object and the software related information to the target wireless-communication key station, the administration server includes information specifying a storage area of the memory of the target wireless-communication key station therein to be transmitted.

9. The software update system according to claim 1, wherein the wireless-communication key station divides the software of the update object and software related information into blocks of a certain size, and one block is stored in one wireless packet and is distributed.

10. The software update system according to claim 9, wherein a size in which the operation definition parameter is managed is a block unit stored in the wireless packet, and a storage position of the operation definition parameter is identified by a block number relative to a top portion of software, and number of blocks counted from top block.

11. A software update method that is applied to a software update system that includes an administration server and a wireless communication terminal connected to the administration server through a communication network, the software update method comprising:

performing update processing of software installed in the wireless communication terminal based on information transmitted from the administration server, wherein a wireless-communication key station that is positioned between the administration server and the wireless communication terminal, and that performs processing of distributing software of an update object transmitted from the administration server to the wireless communication terminal is arranged, and software distribution processing from the administration server to the wireless communication terminal is performed by performing first processing of registering, in a memory of the wireless-communication key station, the software and software related information transmitted from the administration server in a section from the administration server to the wireless-communication key station, and second processing of storing, in a memory of the wireless communication terminal, the software and the software related information distributed from the wireless-communication key station in a section from the wireless-communication key station to the wireless communication terminal.

12. A wireless communication terminal that is applicable to a software update system, wherein the software update system includes an administration server and a wireless communication terminal connected to the administration server through a communication network, and performs update processing of software installed in the wireless communication terminal based on information transmitted from the administration server, wherein a wireless-communication key station that is positioned between the administration server and the wireless communication terminal, and that performs processing of distributing software of an update object transmitted from the administration server to the wireless communication terminal is arranged, a memory configured to store software of the wireless communication terminal is provided in each of the wireless-communication key station and the wireless communication terminal, software distribution processing from the administration server to the wireless communication terminal is performed in two sections of the administration server to the wireless-communication key station, and the wireless-communication key station to the wireless communication terminal, one processing in the two sections is processing of registering the software and software related information transmitted from the administration server in the memory of the wireless-communication key station, and another processing in the two sections is processing of storing the software and the software related information distributed from the wireless-communication key station in the memory of the wireless communication terminal, wherein the software related information includes identification information of the wireless communication terminal to be a target of software update, and software version information and software configuration information, and based on the identification information of the wireless communication terminal, software version information, and software configuration information, software of an update object distributed from the wireless-communication key station is stored in a predetermined storage area of the memory.

13. The wireless communication terminal according to claim 12, wherein the software version information includes version information of an OS and a program, and version information of an operation definition parameter that includes an operation frequency of the program and a constant to be given to the program, and when a software distribution packet that includes software of an update object is received, whether update of the software is supposed is determined based on the respective version information of the OS and the program and the operation definition parameter.

14. The wireless communication terminal according to claim 13, wherein the software distribution packet includes target terminal identification information to identify a wireless communication terminal of an update object, and a wireless communication terminal that receives the software distribution packet compares the object terminal identification information included in the received software distribution packet with device identification information set in the wireless communication terminal, to determine whether the wireless communication terminal is an target terminal that is a terminal of an update object or a non-target terminal that is not a terminal of an update object, and when the wireless communication terminal is the non-target terminal, the wireless communication terminal discards the received software distribution packet.

15. The wireless communication terminal according to claim 14, wherein when the wireless communication terminal is the target terminal, the wireless communication terminal compares software version information that is included in the software distribution packet with software version information that is held by the wireless communication terminal, and when a result of comparison is consistent, the received software distribution packet is discarded.

16. The wireless communication terminal according to claim 14, wherein when the wireless communication terminal is the target terminal and when software version information that is included in the software distribution packet and software version information that is held by the wireless communication terminal is inconsistent, the wireless communication terminal rewrites software in the wireless communication terminal by the received software distribution packet.

17. The wireless communication terminal according to claim 16, wherein when rewriting software in the wireless communication terminal by the received software distribution packet, whether one in a version of the software is being rewritten is determined, and when determined being rewritten, whether a block being rewritten is a block that has been rewritten is determined, and the received software distribution packet is discarded when the block has already been rewritten, and is written in the memory when the block has not been rewritten yet.

18. The wireless communication terminal according to claim 16, wherein when rewriting software in the wireless communication terminal by the received software distribution packet, whether one in a version of the software is being rewritten is determined, and when determined not being rewritten, whether existing software held therein is applicable is determined, and when the existing software is applicable, the existing software is applied, and when the existing software is not applicable, software is newly written.

19. The wireless communication terminal according to claim 12, wherein the memory of the wireless communication terminal is partitioned into an operating software area and a non-operating software area, and write processing at update processing of software is performed to the non-operating software area, and control of switching the non-operating software area to the operating software area after rewrite is completed is performed.

* * * * *